United States Patent [19]
Jetzer

[11] 4,145,007
[45] Mar. 20, 1979

[54] METHOD AND APPARATUS FOR PROCESSING WASTE MATERIALS

[75] Inventor: Raimund Jetzer, Nussbaumen, Switzerland

[73] Assignee: Gewerbebank Baden Aktiengesellschaft, Baden, Switzerland

[21] Appl. No.: 806,596

[22] Filed: Jun. 14, 1977

[30] Foreign Application Priority Data

Jun. 14, 1976 [CH] Switzerland ............ 7498/76

[51] Int. Cl.² .............................................. B02C 23/14
[52] U.S. Cl. ...................................... 241/24; 241/29; 241/76; 241/152 A; 241/DIG. 38
[58] Field of Search ............ 241/24, 29, 65, 76, 241/77, 78, 152 R, 152 A, DIG. 38

[56] References Cited

U.S. PATENT DOCUMENTS

| 3,761,024 | 9/1973 | Schwey et al. | 241/DIG. 38 |
| 3,802,631 | 4/1974 | Boyd | 241/DIG. 38 |
| 3,844,491 | 10/1974 | Williams | 241/DIG. 38 |
| 3,892,706 | 7/1975 | Jetzer | 106/90 |
| 3,905,556 | 9/1975 | Drage | 241/DIG. 38 |
| 3,951,731 | 4/1976 | Jetzer | 162/6 |

Primary Examiner—Howard N. Goldberg
Attorney, Agent, or Firm—Peter K. Kontler

[57] ABSTRACT

Moist municipal waste is subjected to a preliminary comminuting action to reduce the size of solid constituents to less than 100 mm, and the larger heavy particles are thereupon segregated from lighter particles which include relatively small fibrous particles and relatively large additional lighter particles. The additional lighter particles are segregated from the relatively small fibrous particles and are subjected to a severing action to reduce their size to a size not exceeding that of the lighter fibrous particles. The fibrous particles are thereupon mixed with severed additional particles, and the mixture is dried and ozonized prior to classification into larger, medium-sized and smaller fractions. At least the larger fractions are used for the manufacture of shaped articles.

16 Claims, 1 Drawing Figure

U.S. Patent Mar. 20, 1979 4,145,007
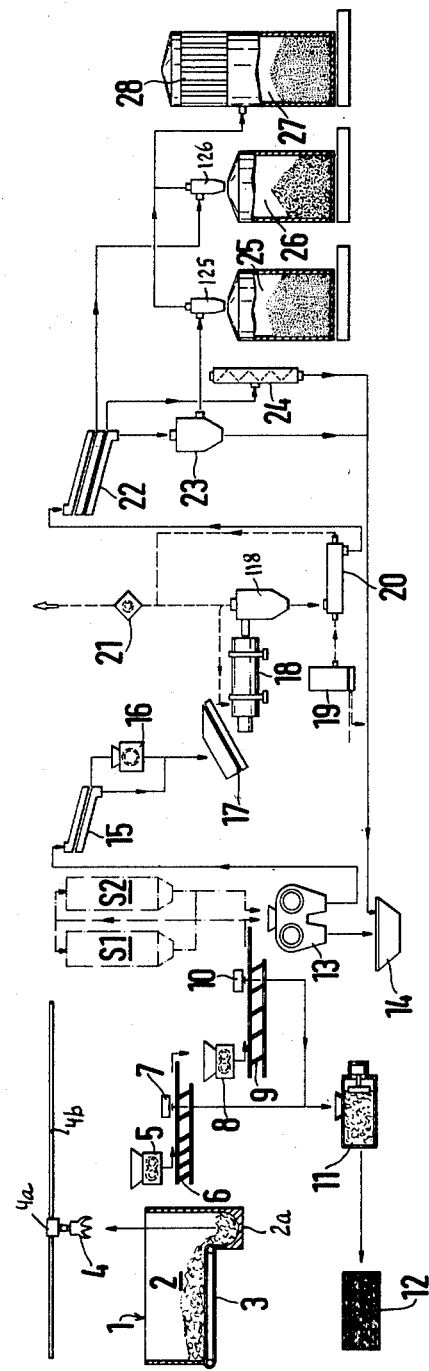

METHOD AND APPARATUS FOR PROCESSING WASTE MATERIALS

BACKGROUND OF THE INVENTION

The present invention relates to a method and apparatus for processing waste materials, such as municipal waste or other wastes containing a relatively high percentage of fibrous material. More particularly, the invention relates to improvements in a method and apparatus for recovering fibers from waste material and for conditioning the recovered fibers so that they can be used for the manufacture of shaped articles.

It is already known to comminute municipal waste or other waste materials, and to thereupon subject comminuted waste to a heating action. The heating action may include or is preceded by conversion or elimination of albumen, sugar, fats and starch from comminuted waste material. Reference may be had to U.S. Pat. Nos. 3,892,706 and 3,951,731 as well as to Swiss Pat. No. 503,576. These patents disclose comminution of waste material in hammer, impact or breaker mills to obtain a particulate material of desired granular or other size. The comminuting step is followed by segregation or destruction of the aforementioned ingredients (albumen, etc.), either prior to or in the course of the heating step.

The heating step is followed by segregation of heavier particles from lighter particles. The heating step results in conversion of comminuted waste into a granular or fibrous substance (i.e., into a granulae and/or fragments which are of wooly or felt-like consistency). Such configurations are not entirely satisfactory, especially when the recovered fibrous material is to be mixed with glue and converted into shaped articles by pressing, extrusion or by resorting to another suitable technique. The constituents of wooly or felt-like consistency are likely to affect the mechanical strength of shaped articles.

OBJECTS AND SUMMARY OF THE INVENTION

An object of the invention is to provide a novel and improved method of recovering fibers from municipal waste or the like.

Another object of the invention is to provide a method of improving the properties of recovered fibers.

A further object of the invention is to provide a method which can be resorted to for recovery of fibrous material having a shape and/or size which is best suited for further processing, such as pressing or extrusion to form shaped articles.

An additional object of the invention is to provide a novel and improved apparatus for the practice of the above outlined method.

A further object of the invention is to provide an apparatus which can recover a high percentage of fibers from waste materials, which can be utilized for satisfactory processing of different types of waste materials, and which can impart to recovered fibrous material a shape and size that is more satisfactory than the size and shape of fibrous materials which are recovered in heretofore known apparatus.

Another object of the invention is to provide novel and improved shaped articles made from the foregoing recovered fibrous material.

One feature of the invention resides in the provision of a method of processing waste material which contains moisture as well as heavier and lighter solid constituents and wherein the lighter constituents include fibers. The method comprises the steps of (A) subjecting moist waste material to a first comminuting action (such comminuting action may include crushing and/or breaking waste material) to thus convert the waste material into heavier particles and lighter particles including lighter fibrous particles of a first size and additional lighter particles of a larger second size (the additional lighter particles normally also include at least some fibers), (B) segregating at least the major percentage of heavier particles from the lighter particles, (C) subjecting the additional lighter particles to a cutting action to thus reduce their size to a size not exceeding the first size, and (D) reducing the moisture content of lighter particles, preferably to a predetermined value.

The step (A) preferably includes reducing the waste material to a particle size of at most 100 mm, most preferably to a particle size of at most 80 mm.

As a rule, the heavier particles will include first heavier particles whose size exceeds and second heavier particles whose size is less than a predetermined size; the step (B) then preferably includes segregating the first heavier particles from second heavier particles and from the lighter particles. The size of second heavier particles is preferably less (and most preferably) considerably less) than the first size (i.e., the size of fibrous particles). The method preferably further comprises the steps of (E) segregating fibrous particles of the first size and the second heavier particles from the additional lighter particles prior to the step (C), and (F) admixing fibrous particles of the first size and the second heavier particles to the comminuted additional lighter particles subsequent to the step (C).

The method preferably also comprises the step of (G) segregating the second heavier particles from fibrous particles of the first size and from comminuted additional lighter particles subsequent to the step (D). The method may further comprise the step of (H) equalizing the moisture content of waste material prior to the step (B), preferably following the step (A).

Albumen, starch, sugar and analogous readily decomposable ingredients of waste material are extracted or converted into stabler substances in the course of and/or prior to the moisture reducing step. Thus, instead of being extracted, albumen, etc. can be converted to materials which are not objectionable and can be retained in or with the fibrous particles. For example, starches can be converted into stable polysacharite fibers.

Another feature of the invention resides in the provision of a novel product, namely of the fibrous material which constitutes the lighter fibrous particles of reduced moisture content.

A further feature of the invention resides in the provision of shaped articles which consist of the just mentioned fibrous material; such articles can be obtained by pressing, by extrusion or by resorting to another suitable technique.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a diagrammatic view of an apparatus which embodies one form of the invention.

DESCRIPTION OF THE PREFERRED EMBODIMENTS

The drawing shows an apparatus which processes waste to obtain three fractions each containing fibrous material. The coarsest fraction (containing the matter of largest particle size between 2 and 8 mm) is collected in a bunker 26, the median fraction (with a particle size of between 0.1 and 2 mm) is collected in a bunker 25, and the finest fraction (dust) is collected in a bunker 27.

Waste material which is processed in accordance with the invention is of the type normally collected by municipal or private garbage collectors. Such waste material is either in loose form (e.g., it is simply dumped into garbage cans whose contents are in turn dumped into the garbage collecting truck) or is stored in plastic bags, paper bags and/or boxes. On the average, the composition of municipal waste material is as follows: approximately, 10–15 percent of glass, sand and rock; approximately 0.5 percent of nonferrous metals; approximately 3–5 percent of iron; approximately 2–3 percent of fragments of fabrics and other textile materials, synthetic plastic materials, leather and wood; approximately 20 percent of kitchen refuse in general; approximately 20 percent of refuse from gardens as well as other types of agricultural and forestry refuse; and approximately 40 percent of paper and wrapping material.

A garbage collecting truck or a conveyor dumps raw waste material into a vessel 2 at an unloading station 1. The bottom wall 3 of the vessel 2 is an endless conveyor which transports waste material in a direction to the right, as viewed in the drawing, and feeds it into a recessed container or trough 2a from which batches of waste material are picked up by a bucket 4 which is movable up and down and is reciprocable with a trolley 4a along an overhead guide rail 4b. Successive batches of waste material are subjected to a first or preliminary comminuting action which is carried out by a pair of serially arranged mills 5 and 8. The mill 5 receives waste material directly from the bucket 4 and its outlet dischrges partially comminuted waste material onto a vibratory conveyor 6 which delivers the material to the second mill 8. The latter discharges comminuted material onto a second vibratory conveyor 9 defining a horizontal or forwardly and downwardly inclined path a portion of which is adjacent to a mobile magnet 10 serving to separate magnetizable materials and to dump the removed materials into a compactor 11 wherein the magnetizable materials are compacted into cakes 12.

The mills 5 and 8 may constitute commercially available machines wherein waste material is caused to pass between two shafts each of which carries one or more rotating or orbiting knives or analogous comminuting elements. Suitable mills are manufactured and sold by the firm Herbold AG, Neckarsheim, Federal Republic Germany under the designation "Messerscheibenzerkleinerer". However, it is equally within the purview of the invention to employ other types of comminuting means, such as beater mills, hammer mills, impact mills and/or others. All that counts is that the comminuting means should be capable of converting raw waste material into particles of predetermined maximum size. Mills with knives are preferred at this time because the processed material contains a lower percentage of wool- or felt-like fibrous constituents. It is equally possible to employ a single mill or to use more than two mills.

In accordance with a presently preferred embodiment of the invention, the comminuting action of the mills 5 and 8 is such that the maximum particle size of comminuted material does not exceed 100 mm and most preferably does not exceed 80 mm. It has been found that preliminary comminution to a particle size in excess of 100 mm is less satisfactory.

If desired, the apparatus may comprise two magnetic separators, namely the aforementioned separator 10 which is adjacent to the path of comminuted material on the vibratory conveyor 9 and a separator 7 which is adjacent to the path of material on the vibratory conveyor 6. Both separators preferably discharge the segregated magnetizable material into one and the same compactor 11. It is clear that the separator 7 or 10 can be used alone or that two or more magnetic separators can be placed adjacent to the vibratory conveyor 6 and/or 9.

The comminuted material which is free of magnetizable constituents is fed into a classifying device 13 which segregates the larger heavier particles from lighter particles. The construction of the classifying device 13 is preferably such that it segregates all heavier particles whose size exceeds 1.5 mm. For example, the classifying device 13 may be of the type manufactured and sold by the firm Simpelkamp KG, Penzberg, Federal Republic Germany under the same "Rotationswindsichter". The segregated heavier particles descend into a trough-shaped conveyor 14 and the remaining particles (which are practically free of heavier particles save for those of a size less than 1.5 mm) are fed onto a vibrating sifter 15 having a mesh of 6 mm. Thus, the mesh is larger than the size of the heaviest particles in the material which is delivered from the right-hand outlet of the classifying device 13. In other words, the heavier particles can pass through the interstices of the sifter 15 together with the smaller lightweight particles. The mesh of the sieve in the sifter 15 is not larger than the size of particles which form the largest fraction (in the bunker 26). The particles which pass through the interstices of the sieve in the sifter 15 descend directly into an intermediate storage tank 17. The particles which are intercepted by the sieve of the sifter 15 are fed into a further comminuting device or mill 16, preferably a mill with several sets of rotating or orbiting knives which subject the larger particles to a cuttting action. The cutting elements of the mill 16 are subjected to negligible wear because the material which is admitted into this mill is practically free of heavier particles and completely free of larger heavy particles. For example, the mill 16 may be of the type manufactured and sold by the firm Pallmann KG, Zweibrucken, Federal Republic Germany. Such mill comprises a housing made of steel and containing a rotor and a stator. The rotor carries a set of mobile knives and the stator carries a set of stationary knives. The housing further contains a sieve having square interstices each having a predetermined cross-sectional area (e.g., 64 square millimeters). The mesh of the sieve determines the size of particles which form the fraction in the bunker 26. The particles which are delivered by the sifter 15 into the housing of the mill 16 descend directly onto the rotor which propels the particles against the stator. The knives of the rotor travel along and cooperate with the knives of the stator so that they cut the particles whereby the comminuted material exhibits clearly defined surfaces and edges. Otherwise stated, the comminuted material resembles minute plates or flat shavings. Such comminuted material descends onto the aforementioned sieve in the housing of the mill 16. Any particles which fail to pass through the interstices of the sieve are entrained by the knives of the rotor and are propelled against the stator to be subjected to a renewed cutting action by the rotor knives which cooperate with the counterknife or counterknives of the stator.

The material which passes through the sieve of the mill 16 descends into the intermediate storaage tank 17 whence the material enters a dryer 18, e.g., a rotary drum-type dryer manufactured and sold by the firm W. Kunz AG, Dietikon, Switzerland. In such dryers, hot gaseous combustion products developing in an oil burner are admitted into one end of the rotary drum and are exhausted at the other end of the drum. As a rule, the temperature in the drum of the dryer 18 exceeds 100° C. but is less than the ignition temperature of the admitted material. The material which passes through the rotating drum is surrounded by a cushion of steam and its moisture content is reduced to approximately 5 percent during a period of approximately 2 minutes. The drying action in the dryer 18 takes place simultaneously with a desirable sterilizing action, i.e., the material is converted into a sterilized fibrous substance which does not contain albumen, starch, sugar and/or analogous readily decomposable constituents. Such constituents are converted into a low molecular form under the action of heat. The particles retain their aforementioned shape (shavings or small plates with pronounced edges between their surfaces or facets).

The dryer 18 discharges conditioned material and the gaseous heating fluid into a cyclone separator 118 wherein a fan segregates the gases and conveys a portion of segregated gases into the intake of the dryer 18. The remaining portion of segregated gases is caused to pass through a venturi-type cleaner 21 prior to being discharged into the atmosphere. The lower outlet of the cyclone separator 118 discharges conditioned waste particles into a mixer 20 wherein the fibrous material is intimately contacted with ozone gas. This insures that fatty acids (e.g., butyric acid) and/or remnants of such acids are segregated from fibrous material to insure that the final product is odorless or that its odor is less offensive. However, it is to be noted that the presence of some fatty acids in the fibrous material is not damaging. The excess of ozone gas is withdrawn and is admitted to hot gases issuing from the upper portion of the cyclone separator 118. The reference character 19 denotes a conventional apparatus which serves for continuous generation of ozone gas and is connected with the mixer 20.

Fibrous material which issues from the mixer 20 is fed to a composite multi-stage sifter or classifier 22 which classifies the material into the aforementioned fractions for admission into the bunkers 25, 26 and 27. The upper sieve of the sifter 22 has a mesh of 2 mm, and the lower sieve of the sifter 22 has a mesh of 0.1 × 0.1 mm. Thus, the largest particles are intercepted by the upper sieve and are caused to enter the bunker 26. Such particles are admitted into the bunker 26 by way of a cyclone separator 126. Particles with a size of less than 2 mm descend onto the next sieve of the sifter 22 and are fed to a further sifter 24. Particles with a size of less than 0.1 mm pass through the lower sieve and are fed into an additional cyclone separator 23. The devices 23 and 24 serve to remove the remaining heavier particles (if any) from the respective fractions. The segregated heavier particles are admitted into the aforementioned conveyor 14. The devices 23 and 24 discharge fibrous material into a cyclone separator 125 which causes dust to enter the bunker 27 and the median fraction to enter the bunker 25.

The bunker 27 is disposed below a filter 28 which withdraws air and intercepts the particles of dust. The fractions which accumulate in the bunkers 25, 26 and 27 can be processed independently of each other, or they may be mixed with each other in desired proportions to form a starting material for the manufacture of shaped articles. The fractions can be mixed with glue and thereupon introduced into molds for the making of press-formed shaped articles.

The fraction in the bunker 26 exhibits the advantage that the particles resemble flat shavings of wood with sharply defined edges and surfaces. Moreover, the percentage of mineral dust in fractions which are stored in the bunkers 25–27 is surprisingly low.

Another advantage of the improved method and apparatus is that they allow for convenient segregation of mineral and/or organic dust from fibrous materials as well as that the dried product can be conveniently and accurately classified according to size. This will be readily appreciated by bearing in mind that the fractions do not include any or contain a low percentage of wooly or felt-like constituents which would be likely to clog the sieve or sieves of the classifying means, such as the sifter 22.

The moisture in raw waste material is often distributed in random fashion. For example, rotten fruits can lie next to newspapers. This could affect the operation of the classifying device 13, i.e., fragments of waste whose moisture content is very high would be likely to become segregated from lighter particles and admitted into the conveyor 14. Therefore, it is desirable to provide the apparatus with means for equalizing the moisture content of comminuted waste material prior to admission of such material into the classifying device 13. For example, the particles of waste material which issue from the mill 8 can be stored in one or more containers (such as S1 and S2) for a certain interval of time (e.g., 4–24 hours). This insures that the moisture content of all particles which can absorb moisture is the same or nearly the same at the time the particles are admitted into the classifying device 13. It is preferred to close the container S1 and/or S2 after the respective container is filled with comminuted waste material.

The provision of at least two containers is desirable in order to insure that the apparatus can process waste material without interruptions, i.e., the container S1 can supply waste material whose moisture content has been equalized while the container S2 receives waste material from the mill 8, or vice versa.

Though it is possible to install the means for equalizing the moisture content upstream of the mill 8 and/or 5, the placing of such equalizing means downstream of the mill 8 is preferred because the equalizing step takes up less time if the container S1 and/or S2 stores comminuted waste material.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed is:

1. A method of processing waste material which contains moisture as well as heavier and lighter solid constituents and wherein said lighter constituents include fibers, comprising the steps of (A) subjecting moist waste material to a first comminuting action to thus convert said waste material into heavier particles and lighter particles including lighter fibrous particles of a first size and additional lighter particles of a larger second size; (B) segregating at least the major percentage of heavier particles from lighter particles; (C) subjecting said additional lighter particles to a cuttting action to thus reduce their size to a size not exceeding said first size; and (D) combining the lighter fibrous particles and reduced additional lighter particles and reducing the moisture content of such lighter particles.

2. A method as defined in claim 1, wherein said step (A) includes reducing waste material to a particle size of at most 100 mm.

3. A method as defined in claim 1, wherein said step (A) includes reducing waste material to a particle size of at most 80 mm.

4. A method as defined in claim 1, wherein said heavier particles include first heavier particles whose size exceeds and second heavier particles whose size is less than a predetermined size, said step (B) including segregating all first heavier particles from said lighter particles.

5. A method as defined in claim 4, wherein the size of said second heavier particles is less than said first size.

6. A method as defined in claim 4, further comprising the steps of (E) segregating fibrous particles of said first size and said second heavier particles from said additional lighter particles prior to said step (C), and (F) admixing the fibrous particles of said first size and said second heavier particles to comminuted additional particles subsequent to said step (C).

7. A method as defined in claim 6, further comprising the step of (G) segregating said second heavier particles from fibrous particles of said first size and from comminuted additional particles subsequent to said step (D).

8. A method as defined in claim 1, wherein said step (A) includes crushing and/or breaking the waste material.

9. A method as defined in claim 1, further comprising the step of (H) equalizing the moisture content of waste material prior to said step (B).

10. A method as defined in claim 9, wherein said step (A) precedes said step (H).

11. Apparatus for processing waste material which contains moisture as well as heavier and lighter solid constituents and wherein said lighter constituents contain fibers, comprising first comminuting means for subjecting moist waste material to a comminuting action and to thus convert such waste material into heavier particles and lighter particles including lighter fibrous particles of a first size and additional lighter particles of a larger second size; means for feeding waste material to said first comminuting means; means for segregating at least the major percentage of heavier particles from said lighter particles; second comminuting cutter means including means for severing said additional lighter particles to thus reduce such additional particles to a size not exceeding said first size; and means for reducing the moisture content of said lighter fibrous particles and said comminuted additional lighter particles.

12. Apparatus as defined in claim 11, wherein said heavier particles include first heavier particles whose size exceeds and second heavier particles whose size is less than a predetermined size, said segregating means including means for segregating said first heavier particles from said second heavier particles and from said lighter particles.

13. Apparatus as defined in claim 12, further comprising means for segregating said second heavier particles and said lighter fibrous particles from said additional lighter particles intermediate said first comminuting means and said second comminuting means and for admixing said lighter fibrous particles and said second heavier particles to comminuted additional lighter particles intermediate said last mentioned segregating means and said moisture content reducing means.

14. Apparatus as defined in claim 11, further comprising a sieve downstream of said comminuting means to intercept all comminuted additional particles whose size still exceeds the maximum size of said fibrous particles.

15. Apparatus as defined in claim 11, further comprising means for equalizing the moisture content of said particles intermediate said first comminuting means and said segregating means.

16. Apparatus as defined in claim 15, wherein said equalizing means comprises at least one container.

* * * * *